(12) United States Patent
Nishijima

(10) Patent No.: US 6,460,876 B1
(45) Date of Patent: Oct. 8, 2002

(54) VEHICULAR AIR-BAG LID STRUCTURE

(75) Inventor: Takayuki Nishijima, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/698,177

(22) Filed: Oct. 30, 2000

(30) Foreign Application Priority Data

Oct. 29, 1999 (JP) ............................................. 11-308568
Nov. 5, 1999 (JP) ............................................. 11-314559

(51) Int. Cl.⁷ ................................................. B60R 21/20
(52) U.S. Cl. ................................................. 280/728.3
(58) Field of Search .......................... 280/728.3, 728.2, 280/728.1, 732

(56) References Cited

U.S. PATENT DOCUMENTS

| | | | |
|---|---|---|---|
| 5,238,264 A | * 8/1993 | Barnes | 280/732 |
| 5,437,469 A | * 8/1995 | Monden | 280/728.3 |
| 5,437,470 A | * 8/1995 | Terai et al. | 280/728.3 |
| 5,810,388 A | 9/1998 | Berardi et al. | 280/728.3 |
| 5,816,609 A | 10/1998 | Gray et al. | 280/728.3 |
| 5,961,142 A | * 10/1999 | Shiraki et al. | 280/728.3 |
| 6,012,735 A | * 1/2000 | Gray et al. | 280/728.2 |
| 6,082,760 A | * 7/2000 | Ukai et al. | 280/728.3 |

* cited by examiner

Primary Examiner—Paul N. Dickson
Assistant Examiner—Faye M. Fleming
(74) Attorney, Agent, or Firm—Sughrue Mion, PLLC

(57) ABSTRACT

A vehicular air-bag lid having a three-layer structure including an outer skin (6), a foaming layer (7), and a core material (8). Substantially square door members (13) are fitted within an opening (12) and are opened about a hinge portion at the time of air bag inflation. A pair of substantially triangular-shaped, in plan view, recessed bead portions (30) project toward the undersides of the respective door members (13). A reinforcing plate (31) accompanies the whole recessed bead portion on the surface side of each door member (13). Each recessed bead portion (30) has two of its three sides respectively disposed along the side of a door member (13) and along a hinge portion.

26 Claims, 6 Drawing Sheets

VEHICULAR AIR-BAG LID STRUCTURE

BACKGROUND OF THE INVENTION

1. Field of the Invention

The present invention relates to a vehicular air-bag lid structure.

2. Description of the Related Art

Some vehicles such as automobiles are equipped with air bag systems as a safety device in case of emergency. Such an air bag system is designed to inflate an air bag body—that has been folded up and contained in a housing disposed in an instrument panel or the like—toward a person within a vehicle chamber by air pressure from an inflator when an impact exceeding a predetermined value is applied to a vehicle body. At that time, the bag body stops the head of the person seated in the predetermined position so as to prevent his head from hitting the instrument panel and the like.

When the air bag body is inflated, it presses a lid portion formed in the instrument panel to form an inflation opening by cleaving grooves formed in the lid portion, so that the bag body is inflated from the inflation opening toward the person in the vehicle chamber.

The instrument panel has a three-layer structure including an outer skin, a foaming layer and a core material in order from its outer surface side. The instrument panel is formed by setting the outer skin and the core material (which are not shown) in a foaming mold and injecting a foaming agent therebetween to form a foaming layer between the outer skin and the core material.

The air-bag lid portion has a multilayer structure including a door member fitted to an open portion formed in the core material of the instrument panel, a foaming layer (although the foaming layer may be omitted) and an outer skin that are laminated on the door member and continuous to the foaming layer and the outer skin of the instrument panel.

The cleavable grooves may be H-shaped or U-shaped in plan view. The H-shaped cleavable grooves in plan view include a lateral cleavable groove extending in the width direction of the vehicle and a pair of parallel vertical cleavable grooves extending from both the respective ends of the lateral cleavable groove in the longitudinal direction of the vehicle. Each of the grooves passes through the core material and the foaming layer toward the underside of the air-bag lid portion so that it reaches part of the outer skin.

In the conventional vehicular air-bag lid structure, however, the outer skin, for example a vinyl chloride outer skin, of the instrument panel tends to elongate at high temperatures. Moreover, because the door member has been formed so that its whole surface is of substantially uniform strength, it does not function to concentrate force in the center of the lid portion, and does not quickly transmit force to the end portion of each cleavable groove. Consequently, it has been difficult to efficiently break the cleavable grooves.

In the conventional vehicular air-bag lid structure, further, because the lateral cleavable groove crosses the vertical cleavable grooves—in the case of the breaking lines in the H-shape, for example—stress is concentrated at the intersecting portion between the lateral and vertical cleavable grooves during a heat aging test. Thus, due to this stress concentration, the outer skin may undesirably be broken.

SUMMARY OF THE INVENTION

An object of the present invention is to solve the foregoing problems by providing a vehicular air-bag lid structure to an instrument panel or the like, which includes an outer skin, a foaming layer and a core material to ensure that the outer skin of the instrument panel is cloven when door members for inflating the air bag are opened regardless of the temperature which may result in elongation of the outer skin.

Another object of the present invention is to provide a vehicular air-bag lid structure wherein no stress is concentrated in a region where breaking lines of an outer skin are formed.

In order to solve the foregoing problems, a first aspect of the present invention is a vehicular air-bag lid structure having a three-layer structure including: an outer skin, a foaming layer and a core material wherein substantially square door members are fitted to an opening and are activated to be opened via a hinge portion at the time of air bag inflation; a pair of substantially triangular, in plan view, recessed bead portions projecting toward the undersides of the respective door members; and a reinforcing plate accompanying the whole recessed bead portion on the surface side of each door member, each triangular recessed bead portion having two of its sides disposed along the side of a door member and along the side of the hinge portion.

According to the invention, when the outer skin is cloven in the H-shape or U-shape by opening the door member, for example, the door member is smoothly deformed at the time the air bag is inflated so that the strength of the side edge opposite to the hinge portion of each door member—i.e., the side edge of the lateral cleavable groove portion in the case of H-shaped cleavage—is free from any lateral turning point with the central portion as a peak. In other words, each door member is smoothly deformed when the air bag is inflated, whereby the pressure applied to the outer skin at the time the air bag is inflated is smoothly and laterally changed to ensure that each door member is cloven when each door member is operated regardless of the temperature and the elongation coefficient. Moreover, the surface side of each door member is made flat because its recessed bead portion is covered with the reinforcing plate thereby making substantially constant the wall-thickness of the foaming layer. Thus, the external appearance quality of the lid portion is not deteriorated.

In a second aspect of the invention, the reinforcing plate—as set forth in the first aspect of the invention—is substantially M-shaped so as to singly cover a pair of lateral recessed bead portions.

Further, according to the invention, because the reinforcing plate for covering the pair of the lateral recessed bead portions is a single body, it is easy to produce and fit to each door member.

In a vehicular air-bag lid structure according to a third aspect of the invention, two sheets of opposed door members are provided.

As the two sheets of door members are symmetrically operated to open, the pressure applied to the outer skin of each door member—when the air bag is inflated—smoothly deforms the door members three-dimensionally about the central portion of the lateral cleavable line to ensure that the outer skin is surely cloven.

A vehicular air-bag lid structure according to a fourth aspect of the invention includes at least a foaming layer and a H-shaped, in plan view, cleavable line therethrough, the H-shaped cleavable line including a lateral cleavable groove portion extending in the width direction of a vehicle and a pair of parallel vertical cleavable groove portions extending from both ends of the lateral cleavable groove portion in the longitudinal direction of the vehicle, wherein a lateral cleavable groove corresponding to the lateral cleavable groove portion and vertical cleavable grooves corresponding to the vertical cleavable groove portion are formed in the outer skin; and a portion equivalent to the intersecting portion between the lateral cleavable groove portion and the vertical cleavable groove portions in the lateral cleavable groove and vertical cleavable grooves is discontinuous.

According to the fourth aspect of the invention, stress is prevented from concentrating in a portion equivalent to the intersecting portion of the outer skin by making discontinuous the lateral cleavable groove and vertical cleavable grooves. Thus, the outer skin is prevented from being broken during a heat aging test.

A vehicular air-bag lid structure according to a fifth aspect of the invention has at least a foaming layer and a H-shaped, in plan view, cleavable line therethrough, the H-shaped cleavable line comprising a lateral cleavable groove portion extending in the width direction of a vehicle and a pair of parallel vertical cleavable groove portions extending from both ends of the lateral cleavable groove portion in the longitudinal direction of the vehicle, wherein only a lateral cleavable groove corresponding to the lateral cleavable groove portion is formed on the outer skin.

According to the invention, stress is prevented from concentrating in the portion equivalent to the intersecting portion between the lateral cleavable groove portion and the vertical cleavable groove portions by forming a lateral cleavable groove corresponding to the lateral cleavable groove portion. Due to this arrangement, the outer skin is prevented from being broken during a heat aging test.

Because the outer skin needs to have at least a base cleavage point when the air bag body is deployed, the provision of only the lateral cleavable groove portion does not adversely affect cleavage.

BRIEF DESCRIPTION OF THE DRAWINGS

The above and other objects and advantages of the present invention will become more apparent by describing in detail preferred embodiments thereof with reference to the accompanying drawings, wherein like reference numerals designate like or corresponding parts throughout the several views, and wherein.

DETAILED DESCRIPTION OF THE PRESENT INVENTION

Figure 1:
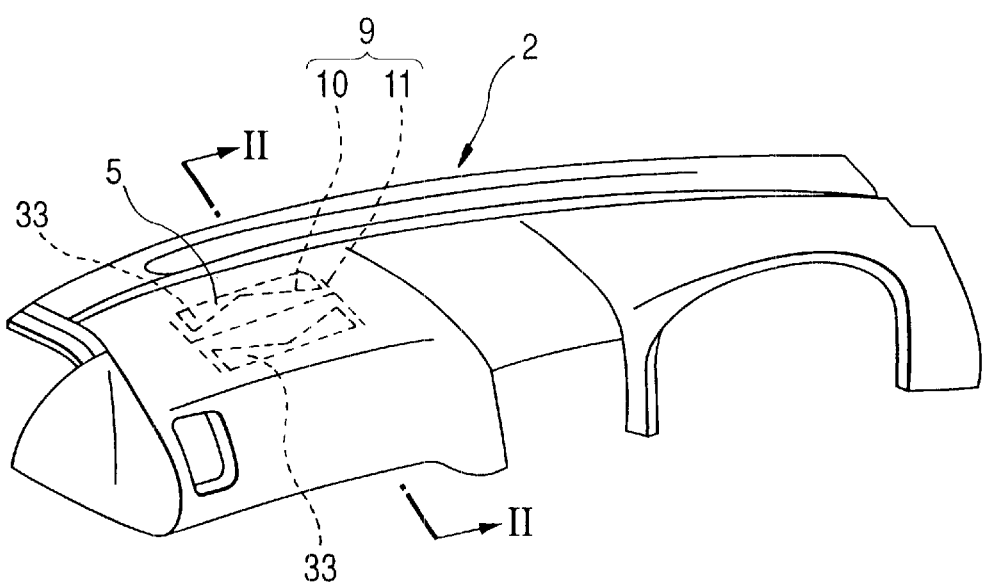
FIG. 1 is a perspective view of an instrument panel according to a first embodiment of the present invention.

A first embodiment of the present invention will now be described with reference to FIGS. 1–3 of the drawings.

An air bag system 3 is installed on the passenger's side of an instrument panel 2, below the front window glass 1 of an automobile. The air bag system 3 includes an air bag module 4, and a lid portion 5. The air bag module 4 will be described later, is used to contain an air bag body, and is disposed within the instrument panel 2. The lid portion 5 forms, in a portion of the instrument panel 2, an inflation opening through which the air bag body is inflated. Although the lid portion 5 is formed integrally with the instrument panel 2, it may be formed separately therefrom.

The instrument panel 2 and the lid portion 5 each have a three-layer structure including an outer skin 6, a foaming layer 7, and a core material 8, in order from the outer surface side. The instrument panel 2 is formed by setting the outer skin 6 and the core material 8 in a foaming mold (not shown) and injecting a foaming agent therebetween to form the foaming layer 7 between the outer skin 6 and the core material 8.

Before the outer skin 6 is set in the foaming mold, a cleavable groove 9 is pre-formed in the lid portion 5 of the outer skin 6. The cleavable groove 9 is formed as a thin-walled portion in part of the outer skin 6 and does not extend entirely through the outer skin 6. The thin-walled portion is formed on the underside of the outer skin 6 by knife-cutting, ultrasonic cutting or laser cutting. In the case of the first embodiment of the invention, the cleavable groove 9 includes one lateral cleavable groove portion 10 and two vertical cleavable groove portions 11. The lateral cleavable groove portion 10 extends in the width direction of a vehicle. The two vertical cleavable groove portions are substantially parallel to one another, extend in the longitudinal direction of the vehicle, and pass opposite end portions of the lateral cleavable groove portion 10; thus, the cleavable groove 9 is substantially H-shaped in plan view.

In the lid portion 5 of the core material 8, before the core material is set in the foaming mold, there is formed an opening 12 into which a metal door member 13 is fitted. The metal door member 13 is attached to the core member 8 via bolts 14 embedded in the core material 8, and nuts 15. In the case of the substantially H-shaped cleavable groove 9, however, two door members 13 are fitted side by side in the longitudinal direction of the vehicle. That is, each door 13 longitudinally extends in the width direction of the vehicle, and one door is in front of the other along the longitudinal direction of the vehicle. In this case, the lateral cleavable groove portion 10 corresponds to a gap between opposed longitudinal sides of the door members 13 and 13, whereas each of the two vertical cleavable groove portions 11 corresponds to a gap between the door members 13 and 13 and a side edge of the opening 12.

Each door member 13 includes a fitting portion 16, a door portion 17, and a hinge portion 18. The fitting portion 16 fixes the door member to the front edge portion or the rear edge portion of the opening 12 by engaging the embedded bolt 14. The door portion 17 is located within the opening 12, and the hinge portion 18 couples the fitting portion 16 with the door portion 17. In order to improve and make uniform the surface rigidity of the lid portion 5, while keeping the wall thickness of the foaming layer 7 being substantially constant, the hinge portion 18 is an even reverse-U-shape so that no difference in level between the fitting portion 16 and the door portion 17 is produced. Moreover, the edge portions on the three sides—i.e., the sides other than the side having hinge portion 18—of each door portion 17 are hem-molded toward the outer skin side, i.e., these edge portions are folded back on top of the door portion 17.

Figure 2:
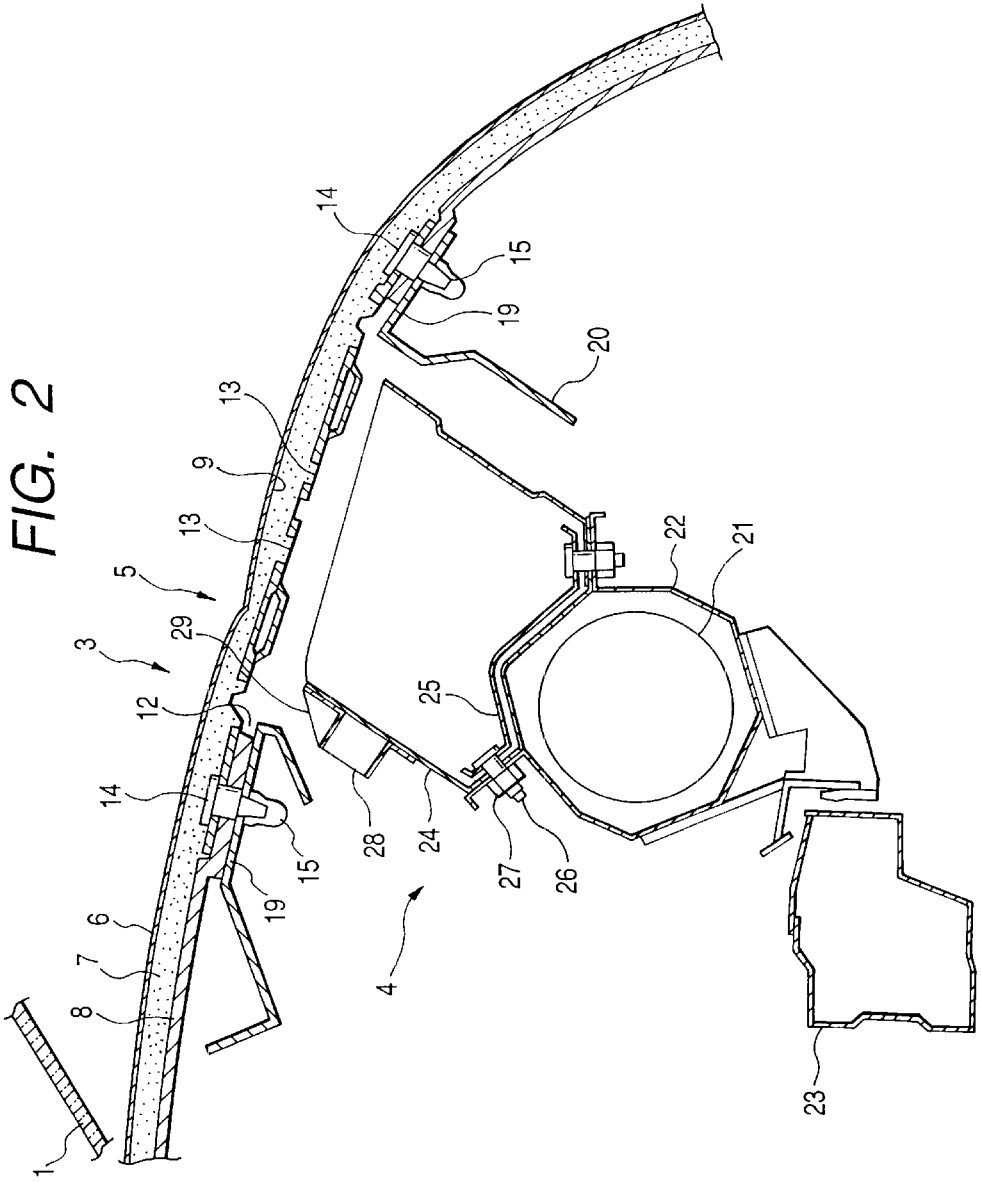
FIG. 2 is a sectional view taken on line II—II of FIG. 1.

Additionally, the embedded bolt 14 is utilized for fitting a reinforcing frame member 19 to the underside of the core material 8. A reinforcing piece 20, which prevents the air bag body from extending substantially obliquely forward and downward so as to become laterally pregnant, projects from an edge portion on the rear side of the reinforcing frame member 19.

further, the air bag module 4 is equipped with a substantially inverted Q-shaped, (in side view as shown in FIG. 2) base member 22 that is capable of containing a cylindrical inflator 21 for jetting out pressurized air. The base member 22 is fixedly clamped to a vertical side of a steering support member 23 with bolts (not shown).

Still further, the air bag module 4 is equipped with a bag container 24 for containing the folded air bag body. A metal retainer 25 is fitted to an air introducing inlet of the air bag body. The bag container 24 is fixedly coupled to the upper portion of the base member 22 via a retainer bolt 26, which projects substantially downward from the retainer 25, and a nut 27.

In the drawing, reference numeral 28 denotes a reinforcing material formed in the bag container 24; and 29 denotes an alien substance mixture preventive sheet fitted so as to block the upper end opening of the bag container 24.

According to the first embodiment of the invention, in each door member 13 there is formed a reinforcing portion 33. The reinforcing portions 33 quickly transmit force along the vertical cleavable groove portions 11 by increasing the strength of the peripheral portion of the lid portion 5—i.e., the side portion adjacent the hinge portion 18 and separated from the lateral cleavable groove portion 10, and the side portions along the vertical cleavable groove portions 11—in comparison with the strength of the central portion where the lateral cleavable groove portion 10 is formed. Because the reinforcing portions 33 increase the strength of the peripheral portion of the lid portion, the stress is concentrated at one point of the central portion of the lateral cleavable groove portion 10.

Figure 3:
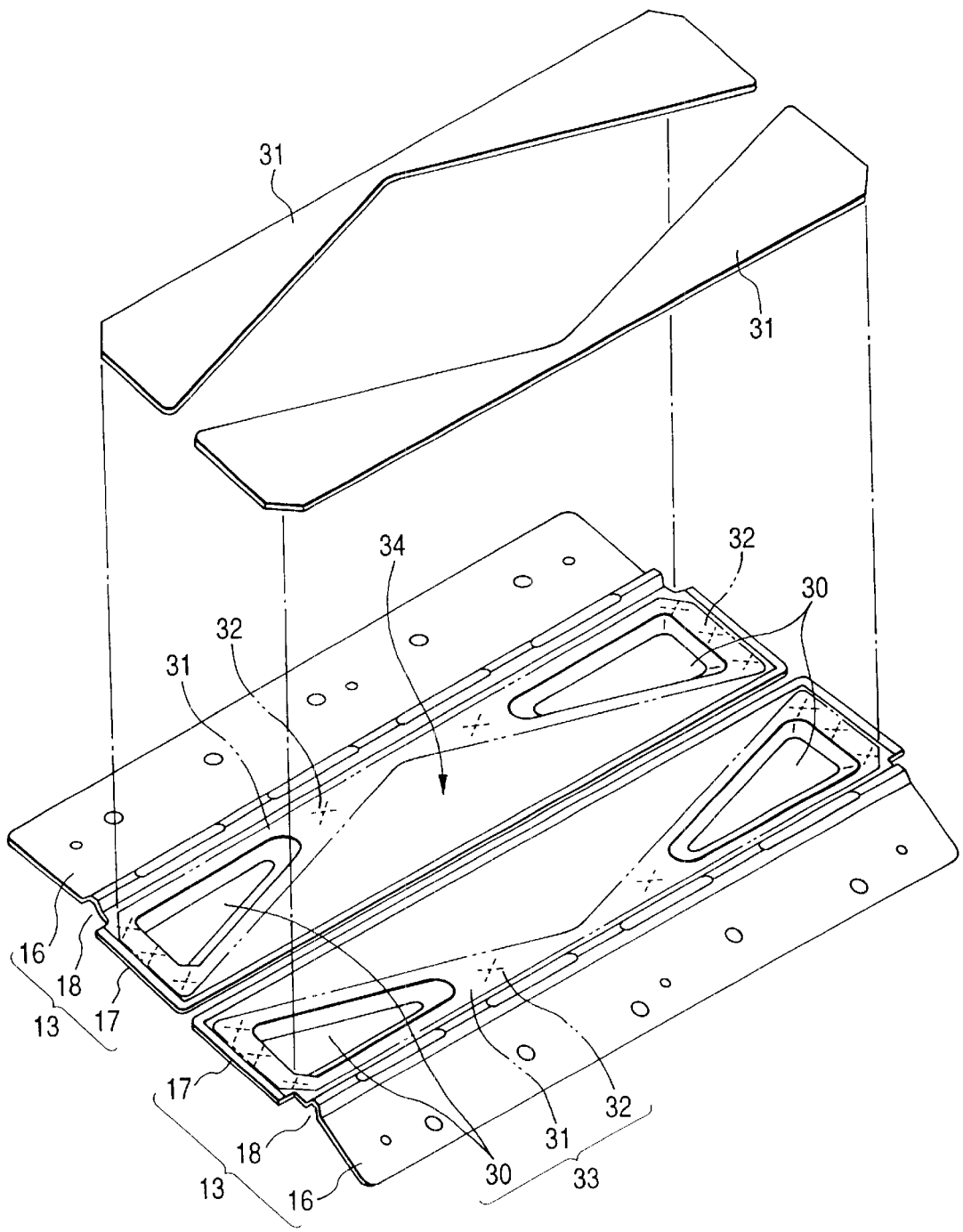
FIG. 3 is a perspective view of the door members shown in FIG. 2.

More particularly, as shown in FIG. 3, each reinforcing portion 33 includes recessed triangular, in plan view, bead-like portions 30, a reinforcing plate 31, and fixing portions 32. The bead-like portions 30 are respectively formed in the corner portions of the door members 13 so as to extend toward the undersides of the doors 13. Further, each bead-like portion 30 extends between a side and the side of the hinge portion 18. Each reinforcing plate 31 is substantially eye-glass-shaped for covering a pair of recessed bead-like portions 30 thereby making flat the surface sides of the door portions 17. The fixing portions 32 are, for example, spot welded portions which fix the reinforcing plates 31 to the peripheral edge portions of the recessed bead-like portions 30.

Further, the reinforcing portions 33 form a diamond-shaped point-symmetric non-reinforced area 34 in the central portion of the door members 13 so that the stress easily concentrates at one point of the central portion of the lateral cleavable groove portion 10.

The function of the first embodiment of the invention will now be described.

When the inflator 21 is actuated, pressurized air is jetted out of the inflator 21 and is introduced into the air bag body.

When the pressurized air is thus introduced, the air bag body is inflated and the inflation pressure causes the lid portion 5 to be cloven, along the H-shaped cleavable groove 9, so that the inflation opening is formed. At the same time, the air bag body is diagonally inflated so as to extend through the inflation opening and backward toward the passenger, whereby the air bag body stops the head of a person on the passenger's side of the vehicle. Thus, the head of the person is protected from being brought into contact with the instrument panel and the like.

According to the first embodiment of the invention, the strength of the peripheral portion—i.e., the sides adjacent the hinge portions and separated from the lateral cleavable groove portion 10, and the sides along the vertical cleavable groove portions—is increased in comparison with the strength of the central portion formed in the lateral cleavable groove portion 10. This increase in strength is due to the reinforcing portions 33 which are provided in the door members 13. Therefore, the point-symmetric non-reinforced area 34 is deformed with stress concentrated at one point of the central portion of the lateral cleavable groove portion 10. The force then is quickly transmitted along the vertical cleavable groove portions 11.

Consequently, the above-described structure ensures that one point of the central portion of the lateral cleavable groove portion is the start of cleavage when the air bag body is inflated. Shortly after the start of cleavage at the central point, the vertical cleavable groove portions 11 are quickly cloven. The outer skin forming the lid portion 5 tends to elongate physically and becomes difficult to cleave at high temperatures as in summer, for example. However, because the pressure of the air bag body is concentrated at one point of the central portion of the lateral cleavable groove portion 10, the outer skin can certainly be cloven even in summer. During winter, in contrast, the outer skin forming the lid portion 5 tends to harden at low temperatures. When the skin hardens, it tends to produce a crack in a portion where the cleavage direction changes from the lateral cleavable groove portion 10 to the vertical cleavable groove portions 11. However, due to the above-described structure, cleavage quickly can be accomplished along the vertical cleavable groove portions 11 even during winter.

As shown in FIG. 3, by having the reinforcing portions 33 include the recessed triangular, in plan view, bead-like portions 30, the reinforcing plates 31 and the fixing portions 32—wherein: the bead-like portions 30 are respectively formed in the corner portions of the door members 13 so as to extend toward the underside of the door members and so as to extend between both sides and the side of the hinge portion 18; the reinforcing plates 31 are substantially eye-glass-shaped for covering respective pairs of recessed bead-like portions 30 thereby making flat the surface sides of the door portions 17; and the fixing portions 32 are, for example, spot welded portions for fixing the reinforcing plates 31 to the peripheral edge portions of the recessed bead-like portions 30—it is possible to improve and make uniform the surface rigidity of the lid portion 5 while keeping the wall thickness of the foaming layer 7 substantially constant.

Although a description has been given of a case where two of the door members are fitted to the air bag inflation opening 12, the opening 12 have fitted therein only one door member 13. Even in the case of one door member 13, the door member 13 includes a fitting portion 16 a door portion 17, and a hinge portion 18. The fitting portion 16 is fixed to the front or rear edge portion of the opening 12 with the embedded bolt 14, the door portion 17 is positioned within the opening 12, and the hinge portion 18 couples the fitting portion 16 and the door portion 17. In this case, the cleavable groove is U-shaped in plan view on the under-side of outer skin 6. As in FIG. 3, the one door member 13 would still include recessed triangular, in plan view, bead-like portions 30, a reinforcing plate 31, and fixing portions 32, wherein: the bead-like portions 30 are respectively formed in corner portions of the door member 13 so as to extend toward the underside of the door member 13, and so as to extend between sides and the hinge portion 18; the reinforcing plate 31 covers the bead portions 30 to make flat the surface side of the door portion 17; and the fixing portion 32 fixes the reinforcing plate 31 to the door portion 17. The rest of the operation and effect are similar to the case where two door members 13 are employed.

Figure 4:
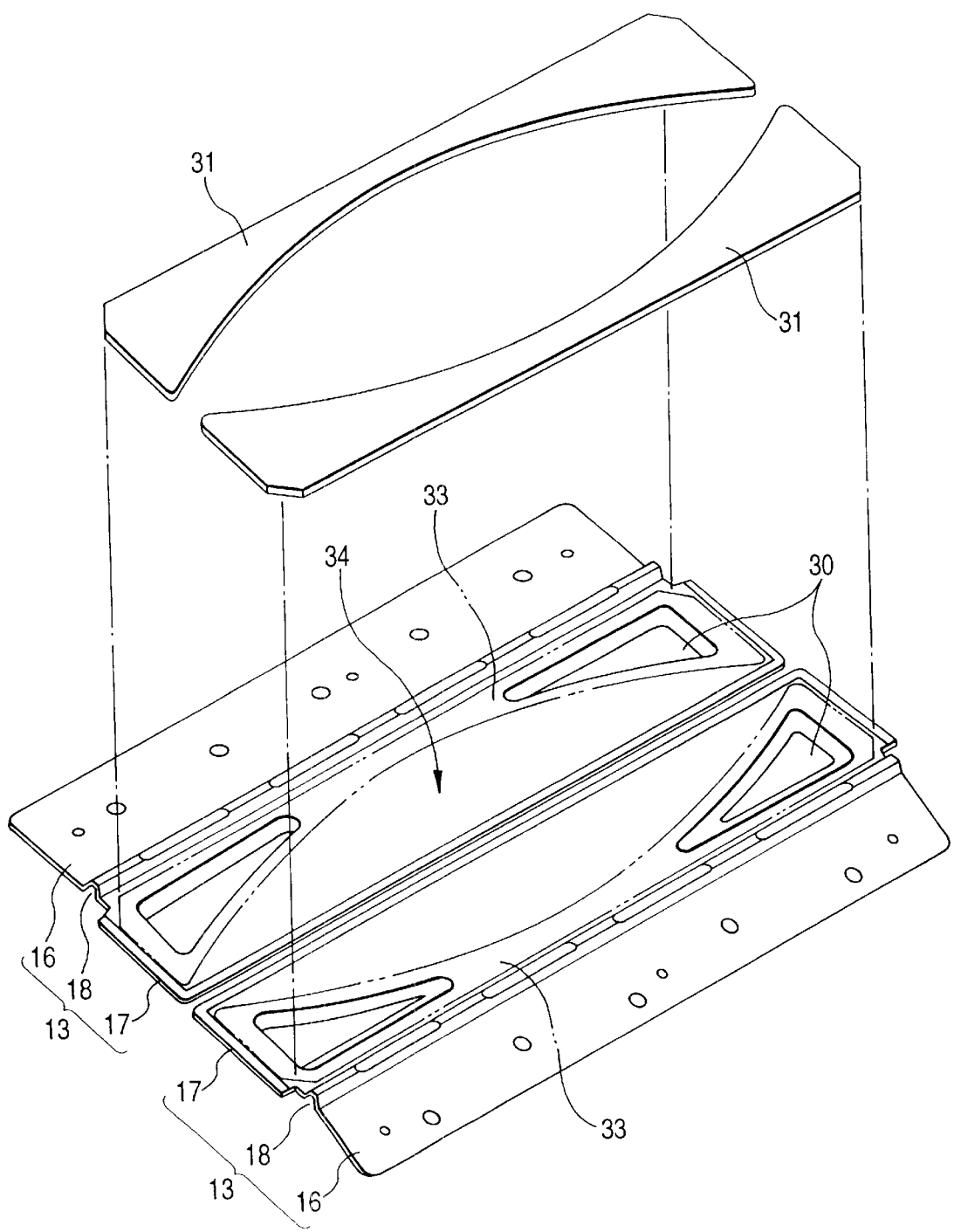
FIG. 4 is a perspective view of door members according to a modified embodiment of the present invention.

FIG. 4 shows a second embodiment of the present invention, wherein the effect of the reinforcing portions 33 is improved further, and the stress is more easily concentrated at one point of the central portion of the lateral cleavable groove portion, by forming a substantially elliptic point-symmetric non-reinforced area 34.

The rest of this embodiment is similar to that of the first embodiment of the invention, so that a similar operation and effect is achieved.

Figure 5:
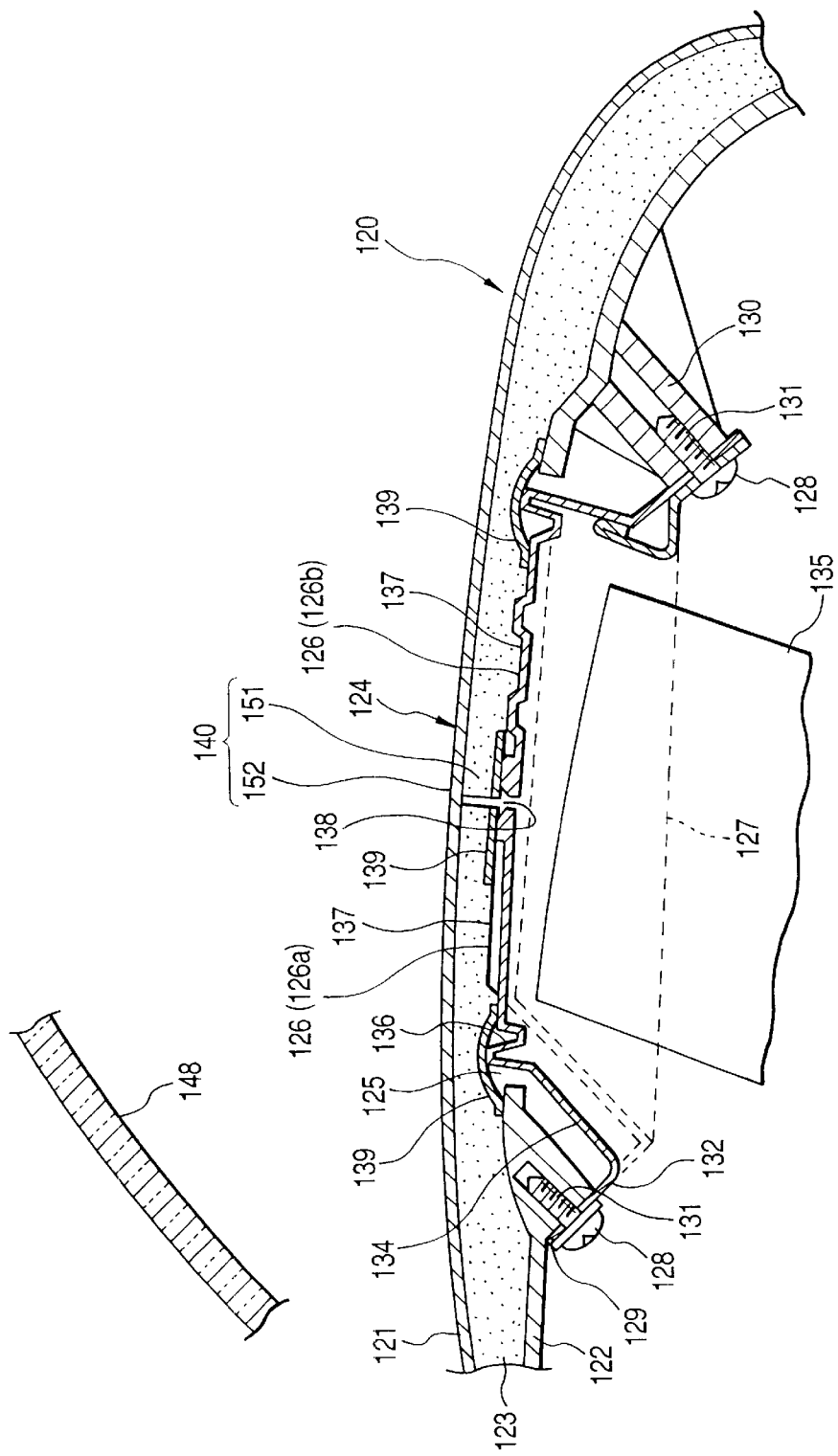
FIG. 5 is a sectional side view according to a third embodiment of the present invention.
Figure 6:
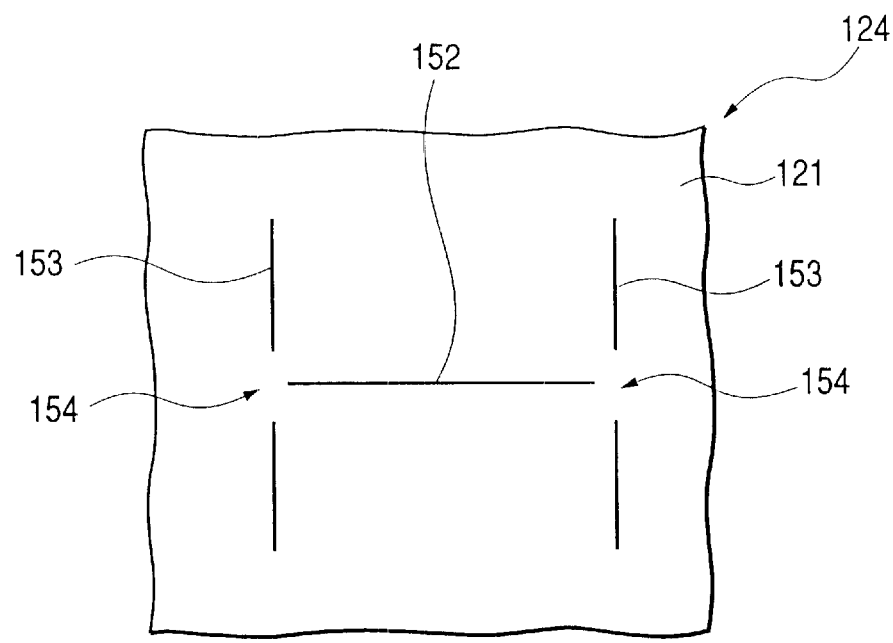
FIG. 6 is a bottom view of the outer skin shown in FIG. 5.

A third embodiment of the invention will now be described with reference to FIGS. 5 and 6 of the drawings, wherein reference numeral 148 denotes a front window glass.

An instrument panel 120 according to the third embodiment of the invention has a three-layer structure similar to that shown in FIG. 1. That is, the instrument panel 120 includes a foaming layer 123 disposed between an outer skin 121 and a core material 122. Further, an air bag lid portion 124 is provided integrally with the instrument panel 120.

The outer skin 121 is made of TEO (Thermoplastic Elastomer of Olefin). The outter skin made of TEO has a tensile elongation that depends on temperature as shown in Table 1.

TABLE 1

| Temperature (° C.) | Tensile elongation (%) | Medium Value (%) |
|---|---|---|
| −30 | 200–500 | 350 |
| 23 | 520–800 | 650 |
| 85 | 200–400 | 320 |

The air bag lid portion 124 is equipped with door members 126—a window-side door member 126a and a passenger-side door member 126b—capable of substantially blocking an opening 125 formed in the core material 122 on the underside thereof. Beneath the door members 126, a reinforcing guide 127 is brought into contact with and substantially supports, the peripheral edge portions of the opening. The door members 126, and the reinforcing guide 127, are fixedly clamped to the core material 122 with screws 128.

Boss portions 129 and 130 laterally extend, and protrude substantially forward and diagonally downward, from the respective front and rear edge portions of the opening 125. Screw holes are formed so as to extend forward and diagonally tilted downward, in the tilted undersides of the boss portions 129 and 130.

Each door member 126 is made of aluminum and includes a fitting surface, for receiving a screw capable of surface contact, formed beneath the boss portions 129 and 130. That is, one fitting surface is formed on the front side of the window-side door member 126a, and another is formed on the rear side of the passenger-side door member 126b. A wrapping margin 134 is uprightly formed along the side face of the boss portion 129, and extends from the screw fitting surface. Further, a door body 137 is disposed substantially in the same plane as that of the core material 122. The door body 137 is connected to the upper end of the wrapping margin 134, within the opening 125, via a hinge portion 136 that is formed in S-shape. The remaining three sides of the door body 137 are free, and form a gap 138 between the door body 137 and the opening 125. Further, a sealing tape 139 is stuck between the core material 122 and the periphery of the door member 126.

In the gap portion 138, around the outer periphery of the three free sides of the door body 137 and the opening 125, a cleavable line 140 is formed by laser cutting, for example, to the depth of the sealing tape 139 and is formed so as to pass through the foaming layer 123. In this case, the cleavable line 140 is H-shaped in plan view and includes a lateral cleavable groove portion 151 laterally extending in the width direction of the vehicle and a pair of parallel vertical cleavable groove portions (not shown) extending in the longitudinal direction of the vehicle, and which are formed on opposite ends of the lateral cleavable groove portion 151.

According to the this embodiment of the invention, also there are formed—in the outer skin 121—a half-cut lateral cleavable groove portion 152 in a position corresponding to that of the lateral cleavable groove portion 151, and half-cut vertical cleavable groove portions 153 in a position corresponding to that of the vertical cleavable groove portions.

Moreover, a discontinuous portion 154 is formed near where the intersection between the lateral cleavable groove portion 152 and the vertical cleavable groove portions 153 would be. Preferably, the gap portion is a circular discontinuity centered on the point where the lateral cleavable groove portion 152 would intersect a vertical cleavable groove portion 153 if they were extended, wherein the circle has a diameter of at least 20 mm. More specifically, the lateral cleavable groove portion 152 and the vertical cleavable groove portions 153 are formed by laser cutting simultaneously when the cleavable line 140 is formed. In other words, the vertical cleavable groove is arranged so that it may be divided into parts by temporarily weakening the laser output when the vertical cleavable groove portion reaches the intersection with the lateral cleavable groove portion 151.

Alternatively, the lateral cleavable groove portion 152 and the vertical cleavable groove portions 153 may be formed in the outer skin 121 after the cleavable line 140 is formed in the sealing tape 139 and the foaming layer 123.

The operation of the third embodiment of the invention will now be described.

The instrument panel 120, formed integrally with the air bag lid portion 124, is molded by injecting a foaming agent between the outer skin 121 set in a mold and the core material 122.

At this time, the door members 126 are fitted to the underside of the core material 122 with screws 128, and the sealing tape 139 is stuck between the core material 122 and the periphery of the door members 126 before the door members are set into the mold, whereby the outer skin 121, the core material 122, and the door members 126 are integrally laminated via the foaming layer 123.

After the instrument panel 120 is molded, the cleavable line 140, which is substantially H-shaped in plan view, is formed by laser cutting the sealing tape 139 and the foaming layer 123 along the peripheral edges of the door members 126 in the gap 138 between the three free sides of each door body 137 and the opening 125 so as to form the air bag lid portion 124.

After the formation of the air bag lid portion 124, the reinforcing guide 127 is fitted to the core material 122 so that it is substantially brought into contact with each door member 126 with the screw 128. At this time, the trouble of detaching a screw may be omitted by arranging to fit the reinforcing guide 127 with a different screw 128 for use in fitting each door member 126 to the core material 122.

As the reinforcing guide 127 is thus post-fitted, the molding structure can be simplified to that extent. Before the reinforcing guide 127 is fitted, the cleavable line 140 may be formed by laser cutting. Because the cleavable line 140 can be provided by laser cutting, the product-to-product developing condition is not uneven.

The air bag lid portion 124 produced through the process above with the instrument panel 120 reinforced by the reinforcing guide 127 is prevented from being deformed and dented when force is applied to the instrument panel 120 from above. That is, the reinforcing guide 127 prevents the instrument panel 120 from having insufficient rigidity.

When the air bag body is inflated, the outer skin 121 on the cleavable line 140 is cloven and the air bag lid portion 124 becomes upright around the hinge portion 136, so that the inflation opening is formed.

According to the third embodiment of the invention, by making discontinuous the intersecting portion between the lateral cleavable groove portion 152 and the vertical cleavable groove portions 153, the stress is prevented from being concentrated in the above intersecting portion of the outer skin 121. Thus, the outer skin is prevented from being broken during a heat aging test.

Figure 7:
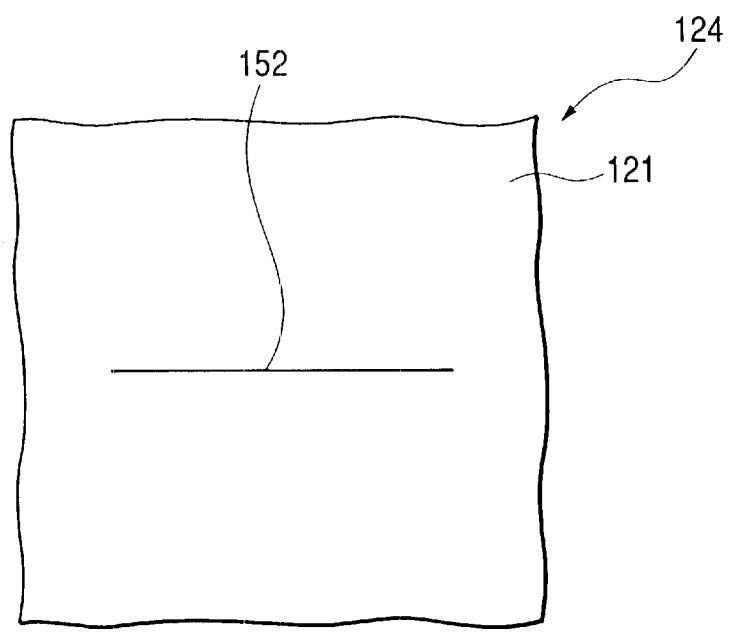
FIG. 7 is a bottom view of an outer skin according to a fourth embodiment of the present invention.

FIG. 7 shows a fourth embodiment of the invention, wherein like reference numerals designate like parts as in the first embodiment and the description thereof is thus omitted here.

According to the fourth embodiment of the invention, only the lateral cleavable groove 152 corresponding to the lateral cleavable groove portion is formed.

With this arrangement, the formation of only the lateral cleavable groove 152, corresponding to the lateral cleavable groove portion 151, prevents the stress from being concentrated at the intersection between the lateral cleavable groove portion 152 of the outer skin 121 and the vertical cleavable groove portions 153, whereby the outer skin is prevented from being broken during a heat aging test.

When the air bag body is deployed, the lateral cleavable groove 152 does not adversely affect cleavage because the outer skin 121 has at least a portion forming a base cleavage point.

As the fourth embodiment of the invention is arranged in the same way as that in the third embodiment thereof, the same operation and effect is achievable.

It is to be understood that the invention is not limited in its application to the details of construction and arrangement of parts illustrated in the accompanying drawings, since the invention is capable of other embodiments and of being practiced or carried out in various designs without departing from the spirit of the invention.

In each of the embodiments of the invention, though the cleavage line has been formed by laser cutting, it may be formed by any other manner as, for example, by an ultrasonic cutter.

As set forth above, according to the invention, when the outer skin is cloven in the H-shape or U-shape by opening the door member, for example, the door member is smoothly deformed at the time the air bag is inflated so that the strength of the side edge opposite to the hinge portion of each door member (i.e., the side edge of the lateral cleavable groove portion in the case of H-shaped cleavage) is free from any lateral turning point with the central portion as a peak. In other words, each door member is smoothly deformed when the air bag is inflated, whereby the pressure applied to the outer skin at the time the air bag is inflated is smoothly and laterally changed to ensure that each door member is cloven when each door member is operated regardless of the temperature and corresponding change in the elongation coefficient. Moreover, the surface side of each door member is made flat as its recessed bead portion is covered with the reinforcing plate thereby making substantially constant the wall-thickness of the foaming layer. Thus, the external appearance quality of the lid portion is not deteriorated.

Because the reinforcing plate for covering the pair of the lateral recessed bead portions is a single body, it is easy to produce and fit to each door member.

According to the invention, as the two sheets of door members are symmetrically operated to open, the pressure applied to the outer skin of each door member when the air bag is inflated is smoothly deformed three-dimensionally with the central portion of the lateral cleavable line as a peak to ensure that the outer skin is surely cloven.

As set forth above, according to the invention, stress is prevented from concentrating in a portion equivalent to the intersecting portion of the outer skin by making the lateral cleavable groove and vertical cleavable grooves. Thus, the outer skin is prevented from being broken during a heat aging test.

According to the invention, the stress is prevented from concentrating in the portion equivalent to the intersecting portion between the lateral cleavable groove portion and the vertical cleavable groove portions by forming only a lateral cleavable groove, in the outer skin, corresponding to the lateral cleavable groove portion in the foaming layer. Due to this arrangement, the outer skin is prevented from being broken during a heat aging test.

What is claimed is:

1. A vehicular air-bag lid structure comprising:
a core member having an opening;
a door member having two side ends and longitudinal sides extending between the two side ends, wherein one of the longitudinal sides of the door member is connected to the core member;
a foaming layer disposed on the core member and the door member; and
a skin layer disposed on the foaming layer,
wherein the door member includes a concave portion, said concave portion having at least one boundary which extends in a direction oblique to a second one of the longitudinal sides,
wherein the concave portion includes a pair of concave portions, and
a width, in a direction perpendicular to the hinge, of each concave portion decreases as the concave portion extends in a direction toward a center of the hinge.

2. The vehicular air-bag lid structure as claimed in claim 1, wherein the door member has a hinge substantially parallel to the second one of the longitudinal sides to open the door member pivotally.

3. The vehicular air-bag lid structure as claimed in claim 2, wherein the concave portion has a width in a direction perpendicular to the second one of the longitudinal sides, the width decreasing as the width is measured at successive positions along a direction from one of the side ends toward the center of the hinge.

4. The vehicular air-bag lid structure as claimed in claim 1, wherein said concave portion protrudes in a direction opposite to the foaming layer from said door member.

5. The vehicular air-bag lid structure as claimed in claim 1, wherein the concave portion is so positioned that a length, in the direction perpendicular to the second one of the longitudinal sides, from a side of the door member opposite to the hinge to the concave portion increases as the length is measured at successive positions along a direction from one of the side ends toward the center of the hinge.

6. The vehicular air-bag lid structure as claimed in claim 1 further comprising a reinforcing plate covering the concave portion on the door member.

7. The vehicular air-bag lid structure as claimed in claim 1, wherein the door member is substantially square.

8. The vehicular air-bag lid structure as claimed in claim 2, further comprising an air-bag apparatus having an airbag disposed to face the door member, wherein the door member is opened by pivoting about the hinge when the air bag inflates.

9. The vehicular air-bag lid structure as claimed in claim 2, wherein the concave portion has a triangular shape, and two sides of the triangular shape are respectively positioned along one of the side ends and the hinge.

10. The vehicular air-bag lid structure as claimed in claim 6, wherein the reinforcing plate is substantially M-shaped to cover the concave portion.

11. The vehicular air-bag lid structure as claimed in claim 1, wherein the door member comprises a pair of door members each having two side ends and longitudinal sides extending between the two side ends, and wherein one of the longitudinal sides of each of the door members is connected to the core member to cover the opening of the core member.

12. The vehicular air-bag lid structure as claimed in claim 1, wherein a first cleavable line is formed on the skin layer corresponding to the second one of the longitudinal sides of the door member and the first cleavable line extends in a direction from one of said side ends to the other of said side ends.

13. The vehicular air-bag lid structure as claimed in claim 12, wherein two second cleavable lines arranged in parallel to each other are formed on the skin layer, the two second cleavable lines are arranged perpendicular to the first cleavable line, and the first cleavable line is not connected to the two second cleavable lines.

14. The vehicular air-bag lid structure as claimed in claim 13, wherein the first cleavable line and the two second cleavable lines form a H-shape.

15. The vehicular air-bag lid structure as claimed in claim 14, wherein each of the two second cleavable lines comprises a plurality of second cleavable lines which are not connected to each other.

16. The vehicular air-bag lid structure as claimed in claim 12, wherein the skin layer is made of elastomer having a tensile elongation of 200 to 500% at −30° C., 520 to 800% at 23° C., and 200 to 400% at 85° C.

17. A vehicular air-bag lid structure comprising:

a core member having an opening;

a door member having two side ends and longitudinal sides extending between the two side ends, said door member being connected to the core member, wherein one of the longitudinal sides is on the core member, a foaming layer disposed on the core member and the door member; and a skin layer disposed on the foaming layer, wherein the door member includes a bead portion disposed on a peripheral portion of the door member for strengthening the peripheral portion of said door member in comparison with the strength of a central portion along a second one of said longitudinal sides which is non-reinforced area, wherein the concave portion includes a pair of concave portions, and a width, in a direction perpendicular to the hinge, of each concave portion decreases as the concave portion extends in a direction toward a center of the hinge.

18. The vehicular air-bag lid structure according to claim 17, wherein the door member includes two of the bead portion, wherein said two bead portions are disposed adjacent to respective ones of said side ends of said door member.

19. The vehicular air-bag lid structure according to claim 17, further comprising a first cleavable line formed on the skin layer in a position corresponding to that of said second one of said longitudinal sides of the door member.

20. The vehicular air-bag lid structure as claimed in claim 17, wherein the skin layer is made of elastomer having a tensile elongation of 200 to 500% at −30° C., 520 to 800% at 23° C., and 200 to 400% at 85° C.

21. A vehicular air-bag lid structure comprising:

a core member having an opening;

a door member having two side ends and longitudinal sides extending between the two side ends, said door member being connected to the core member by a hinge connected to one of said longitudinal sides such that said door member covers the opening; and a skin layer on the core member and the door member, wherein a first cleavable line is formed on the skin layer in a position corresponding to a second one of the longitudinal sides of the door member, and the first cleavable line extends in a direction from one of said side ends towards the other of said side ends, wherein the concave portion includes a pair of concave portions, and a width, in a direction perpendicular to the hinge, of each concave portion decreases as the concave portion extends in a direction toward a center of the hinge.

22. The vehicular air-bag lid structure as claimed in claim 21, wherein two second cleavable lines arranged in parallel to each other are formed on the skin layer, the two second cleavable lines are arranged perpendicular to the first cleavable line, and the first cleavable line is not connected to the two second cleavable lines.

23. The vehicular air-bag lid structure as claimed in claim 21, wherein the first cleavable line and the two second cleavable lines form a H-shape.

24. The vehicular air-bag lid structure as claimed in claim 23, wherein each of the two second cleavable lines comprises a plurality of second cleavable lines which are not connected to each other.

25. The vehicular air-bag lid structure as claimed in claim 21, wherein the first cleavable line and the two second cleavable lines form a U-shape.

26. The vehicular air-bag lid structure as claimed in claim 21, wherein the skin layer is made of elastomer having a tensile elongation of 200 to 500% at −30° C., 520 to 800% at 23° C., and 200 to 400% at 85° C.

* * * * *